United States Patent
Jung et al.

(10) Patent No.: US 10,638,348 B2
(45) Date of Patent: Apr. 28, 2020

(54) FREQUENCY INFORMATION REPORTING METHOD PERFORMED BY TERMINAL IN WIRELESS COMMUNICATION SYSTEM, AND TERMINAL USING METHOD

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/564,170

(22) PCT Filed: Apr. 11, 2016

(86) PCT No.: PCT/KR2016/003804
§ 371 (c)(1),
(2) Date: Oct. 3, 2017

(87) PCT Pub. No.: WO2016/163858
PCT Pub. Date: Oct. 13, 2016

(65) Prior Publication Data
US 2018/0124621 A1    May 3, 2018

Related U.S. Application Data

(60) Provisional application No. 62/145,493, filed on Apr. 9, 2015.

(51) Int. Cl.
*H04W 24/10* (2009.01)
*H04W 76/14* (2018.01)
(Continued)

(52) U.S. Cl.
CPC ....... *H04W 24/10* (2013.01); *H04W 72/0453* (2013.01); *H04W 76/14* (2018.02);
(Continued)

(58) Field of Classification Search
CPC .. H04W 24/10; H04W 76/14; H04W 72/0453
See application file for complete search history.

(56) References Cited

U.S. PATENT DOCUMENTS

| 2014/0169261 | A1 | 6/2014 | Ming et al. |
| 2015/0016357 | A1 | 1/2015 | Yie et al. |
| 2018/0054804 | A1* | 2/2018 | Luo ................. H04W 72/04 |

FOREIGN PATENT DOCUMENTS

KR    10-2012-0074255 A    7/2012

OTHER PUBLICATIONS

3GPP; TS 36.331; Mar. 2015; 3GPP; 12.5.0 (Year: 2015).*
(Continued)

*Primary Examiner* — Ricky Q Ngo
*Assistant Examiner* — Stephen N Steiner
(74) *Attorney, Agent, or Firm* — Birch, Stewart, Kolasch & Birch, LLP

(57) ABSTRACT

Provided are a frequency information reporting method performed by a terminal in a wireless communication system, and the terminal using the method. The method generates first frequency information indicating a frequency enabling a terminal sidelink operation to be performed, and second frequency information indicating a frequency enabling a relay sidelink operation to be performed, and transmits the first frequency information and the second frequency information to a network.

5 Claims, 21 Drawing Sheets

```
freqInfo A              freqInfo B              freqInfo

Frequency #n            Frequency #k            Frequency #n, flag=0
Frequency #m            Frequency #j            Frequency #m, flag=0

Frequency #k, flag=1
                                                Frequency #j, flag=1

(a)                                            (b)
```

(51) Int. Cl.
*H04W 72/04* (2009.01)
*H04W 76/27* (2018.01)
*H04W 48/20* (2009.01)
*H04W 8/24* (2009.01)
*H04W 28/02* (2009.01)
*H04W 88/04* (2009.01)

(52) U.S. Cl.
CPC .......... *H04W 8/24* (2013.01); *H04W 28/0215* (2013.01); *H04W 48/20* (2013.01); *H04W 76/27* (2018.02); *H04W 88/04* (2013.01)

(56) References Cited

OTHER PUBLICATIONS

3GPP; TS 36.331; Dec. 2015; 3GPP; 13.0.0 (Year: 2015).*
3GPP TR 23.713 V1.0.0 (Feb. 2015), Technical Report, 3rd Generation Partnership Project; Technical Specification Group Services and System Aspects; Study on extended architecture support for proximity-based services, (Release 13), Mar. 18, 2015, 61 pages.
3GPP TS 36.304 V8.5.0 (Mar. 2009), Technical Specification, 3rd Generation Partnership Project; Technical Specification Group Radio Access Network; Evolved Universal Terrestrial Radio Access (E-UTRA); User Equipment (UE) procedures in idle mode (Release 8), 30 pages.
3GPP TS 36.331 V12.5.0 (Mar. 2015), Technical Specification, 3rd Generation Partnership Project; Technical Specification Group Radio Access Network; Evolved Universal Terrestrial Radio Access (E-UTRA); Radio Resource Control (RRC); Protocol specification (Release 12), Mar. 27, 2015, 447 pages.

* cited by examiner

FREQUENCY INFORMATION REPORTING METHOD PERFORMED BY TERMINAL IN WIRELESS COMMUNICATION SYSTEM, AND TERMINAL USING METHOD

CROSS REFERENCE TO RELATED APPLICATIONS

This application is the National Phase of PCT International Application No. PCT/KR2016/003804, filed on Apr. 11, 2016, which claims priority under 35 U.S.C. 119(e) to U.S. Provisional Application No. 62/145,493, filed on Apr. 9, 2015, all of which are hereby expressly incorporated by reference into the present application.

BACKGROUND OF THE INVENTION

Field of the Invention

The present invention relates to wireless communication, and more particularly, to a frequency information reporting method performed by a terminal in a wireless communication system, and a terminal using the method.

Related Art

The International Telecommunication Union Radio Communication Sector (ITU-R) is conducting a standardization operation of International Mobile Telecommunication (IMT)-Advanced which is a next-generation mobile communication system after 3rd generation. The IMT-Advanced aims to support IP (Internet Protocol) based multimedia service at data rate of 1 Gbps in stationary and low-speed moving states and 100 Mbps in a high-speed moving state.

The 3rd Generation Partnership Project (3GPP) as a system standard that meets the requirements of the IMT-Advanced prepares for LTE-Advanced (LTE-A) created by improving Long Term Evolution (LTE) based on Orthogonal Frequency Division Multiple Access (OFDMA)/Single Carrier-Frequency Division Multiple Access (SC-FDMA). The LTE-A is one of the strong candidates for the IMT-Advanced.

In recent years, there has been a growing interest in device-to device (D2D) technology for direct communication between devices. In particular, the D2D has attracted attention as communication technology for a public safety network. Commercial communication networks are rapidly changing to LTE, but current public safety networks are mainly based on 2G technology in terms of conflicts with existing communication standards and cost. The technological gaps and demands for improved services have led to efforts to improve the public safety networks.

The public safety networks have higher service requirements (reliability and security) than the commercial communication networks and require direct signal transmission and reception, or D2D operation, between the devices, particularly when coverage of cellular communications is insufficient or unavailable.

The D2D operation may be referred to as a proximity service (ProSe) operation and may have various advantages in that the D2D operation is signal transmission/reception between neighboring devices. For example, a D2D terminal has high data rate and low latency and is capable of data communication. In addition, the D2D operation can distribute traffic which concentrates on a base station and can also serve to expand the coverage of the base station if the D2D terminal serves as a relay.

Meanwhile, the D2D terminal may operate even as a terminal that serves as a relay that connects sidelink and cellular link. That is, the D2D terminal may operate as a relay terminal. For example, when a first terminal in network coverage communicates with a second terminal outside the network coverage, the D2D operation may be used. In this case, the D2D operation confined between the first and second terminals, for example, there is an operation in which the second terminal intends to directly transmit data, but there may be an operation in which the second terminal intends to transmit data to a network through the first terminal. That is, the terminal may serve as the relay between another terminal and the network and in this case, the terminal is referred to as a relay terminal.

In the related art, it is assumed that a frequency at which the relay terminal provides a relay service and a frequency at which the D2D operation is performed are the same as each other, but in a further wireless communication system, the frequency at which the relay terminal provides the relay service and the frequency at which the D2D operation is performed may be different from each other. Accordingly, it is difficult to similarly apply a technology on the assumption that the frequency at which the relay service is provided and the frequency at which the D2D operation is performed are the same as each other to the future wireless communication system.

SUMMARY OF THE INVENTION

The present invention provides a frequency information reporting method performed by a terminal in a wireless communication system, and a terminal using the method.

In an aspect, a frequency information reporting method performed by a terminal in a wireless communication system is provided. The method comprises generating first frequency information indicating a frequency enabling a terminal sidelink operation to be performed, and second frequency information indicating a frequency enabling a relay sidelink operation to be performed and transmitting the first frequency information and the second frequency information to a network.

The relay sidelink operation may be a sidelink operation related with a case where the terminal performs relaying between another terminal and the network.

The terminal sidelink operation may be a sidelink operation irrespective to the relay between another terminal and the network.

The first frequency information and the second frequency information may be transmitted while being included in sidelink terminal information indicating that the UE announces information on sidelink to the network.

The first frequency information may indicate one or more frequencies.

The second frequency information may indicate one or more frequencies.

The first frequency information may be configured by a first frequency list and the second frequency information is configured by a second frequency list.

One frequency list including all of frequencies indicated by the first frequency information and frequencies indicated by the second frequency information may be transmitted to the network.

The frequencies indicated by the second frequency information among the frequencies included in the one frequency list may be identified by a flag.

In another aspect, a terminal is provided. The terminal comprises a radio frequency (RF) unit transmitting and receiving a radio signal and a processor operated in association with the RF unit, wherein the processor generates first frequency information indicating a frequency enabling a terminal sidelink operation to be performed, and second frequency information indicating a frequency enabling a relay sidelink operation to be performed, and transmits the first frequency information and the second frequency information to a network.

A terminal announces a frequency to provide a relay service and a frequency to perform a D2D operation regardless of the relay service to a network. Accordingly, the network performs scheduling of the terminal and the other terminal by considering at which the relay service is provided to reduce interference given to the relay service of the terminal. Consequently, a quality of the relay service using the D2D operation can be increased and continuity can be guaranteed.

DESCRIPTION OF EXEMPLARY EMBODIMENTS

Figure 1:
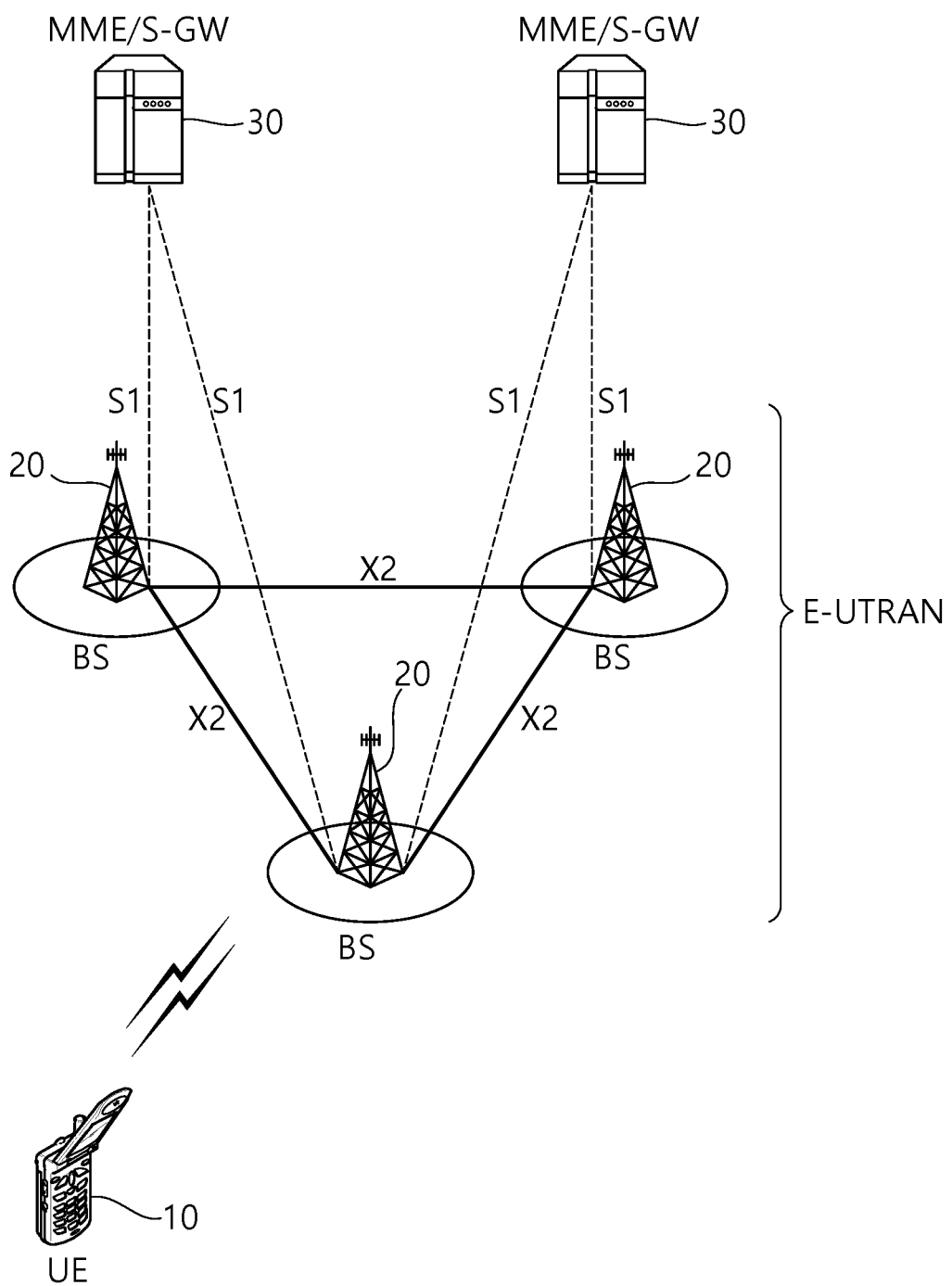
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
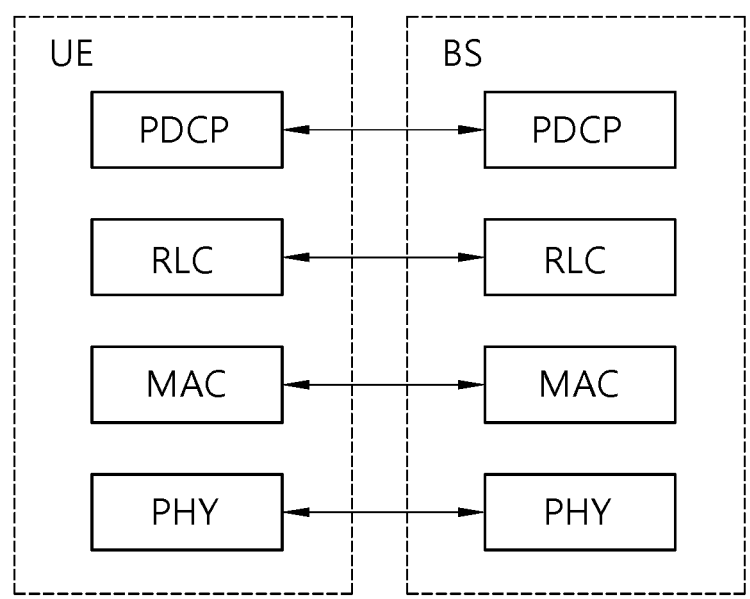
FIG. 2 is a diagram showing a wireless protocol architecture for a user plane.
Figure 3:
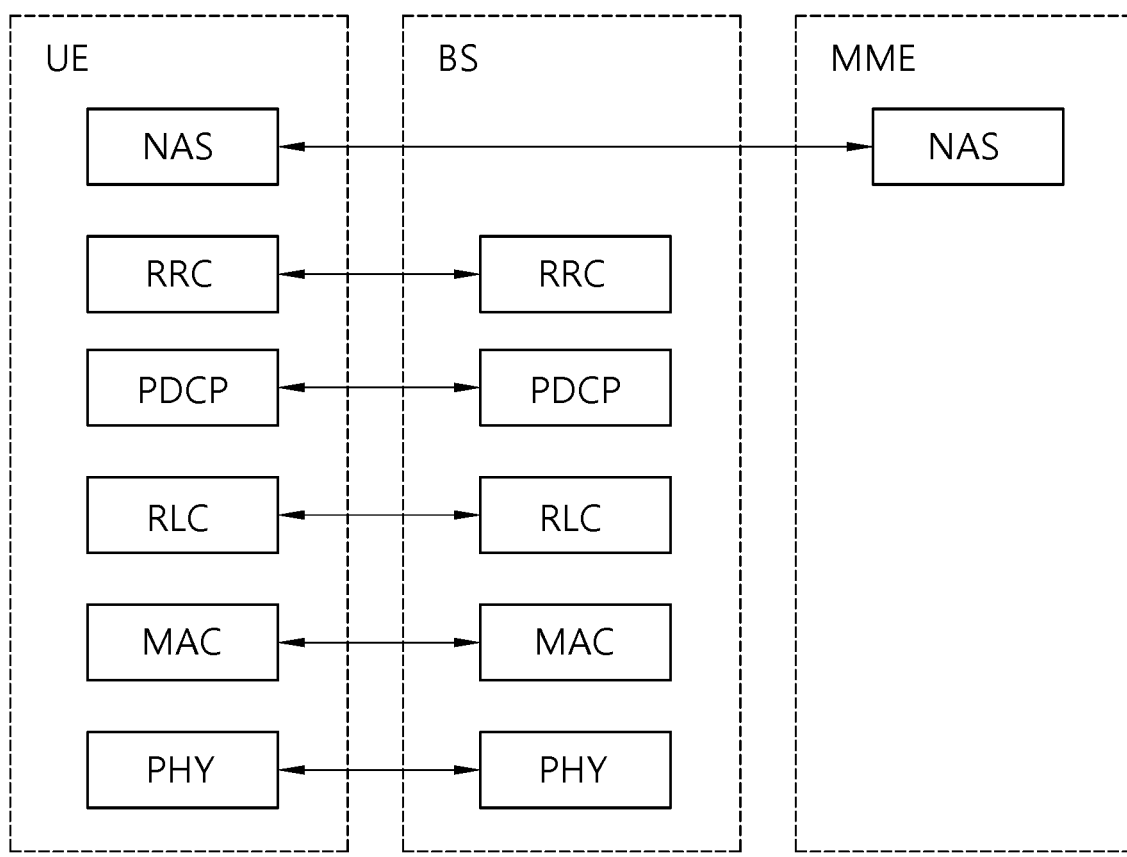
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
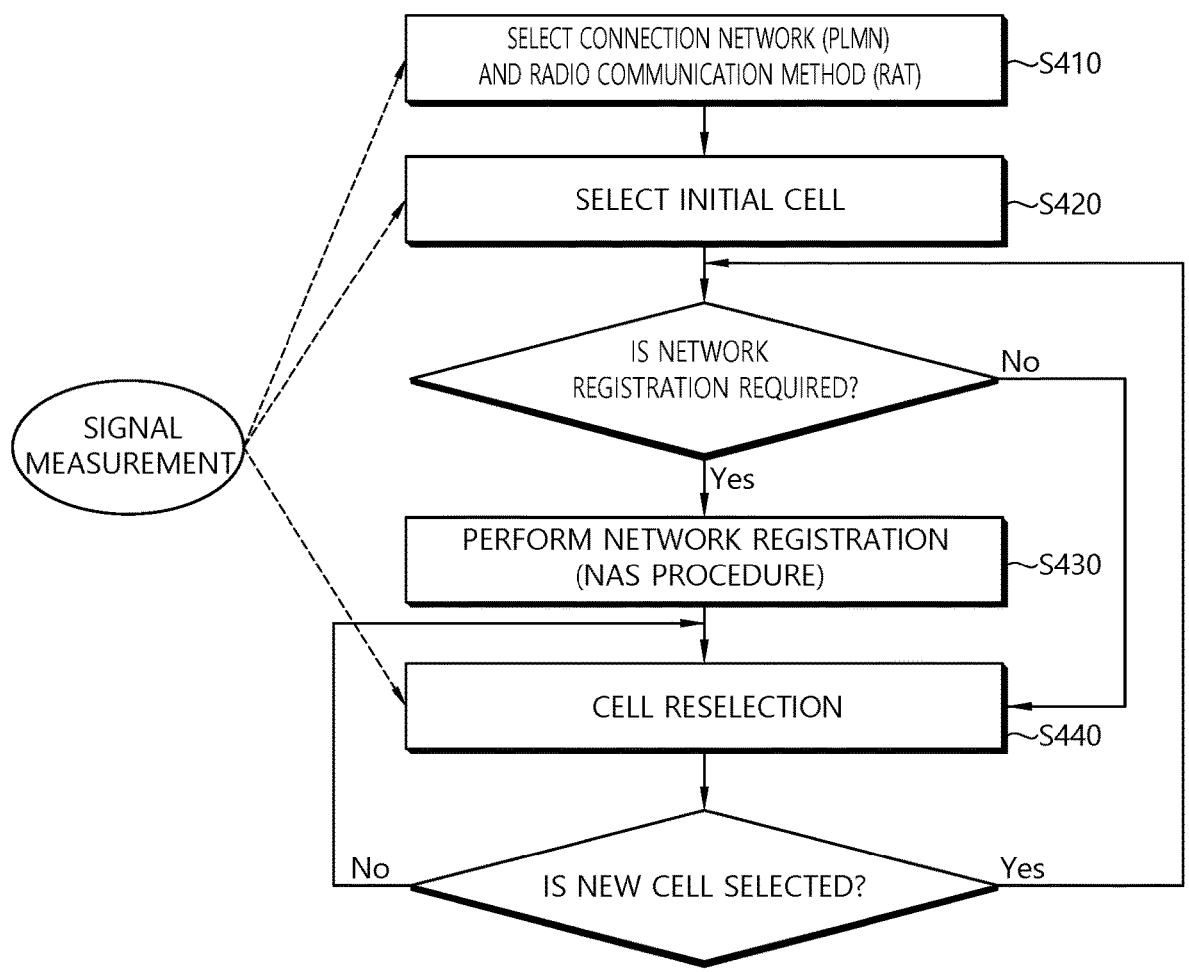
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in a data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
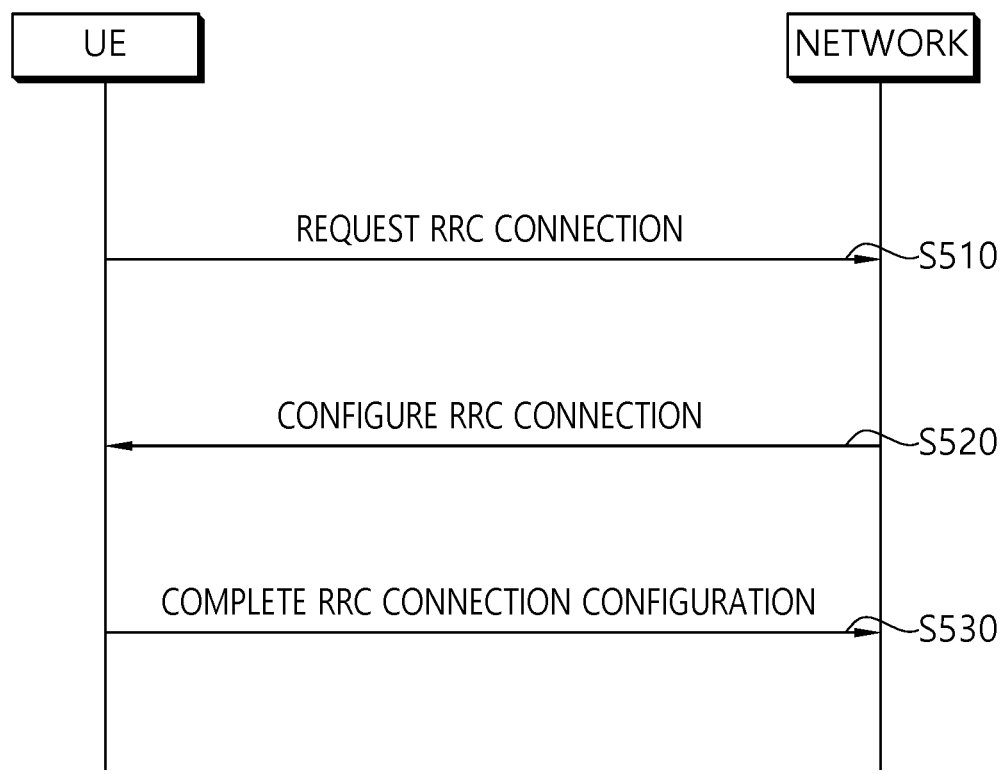
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
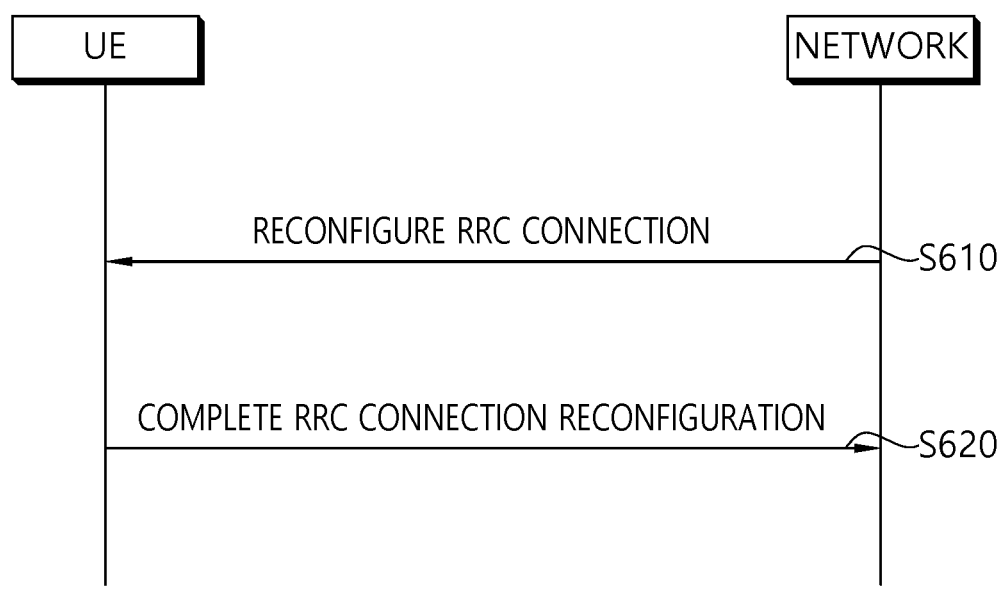
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev > 0 \text{ AND } \& Squal > 0. \quad \text{[Equation 1]}$$

where:

$$Srxlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
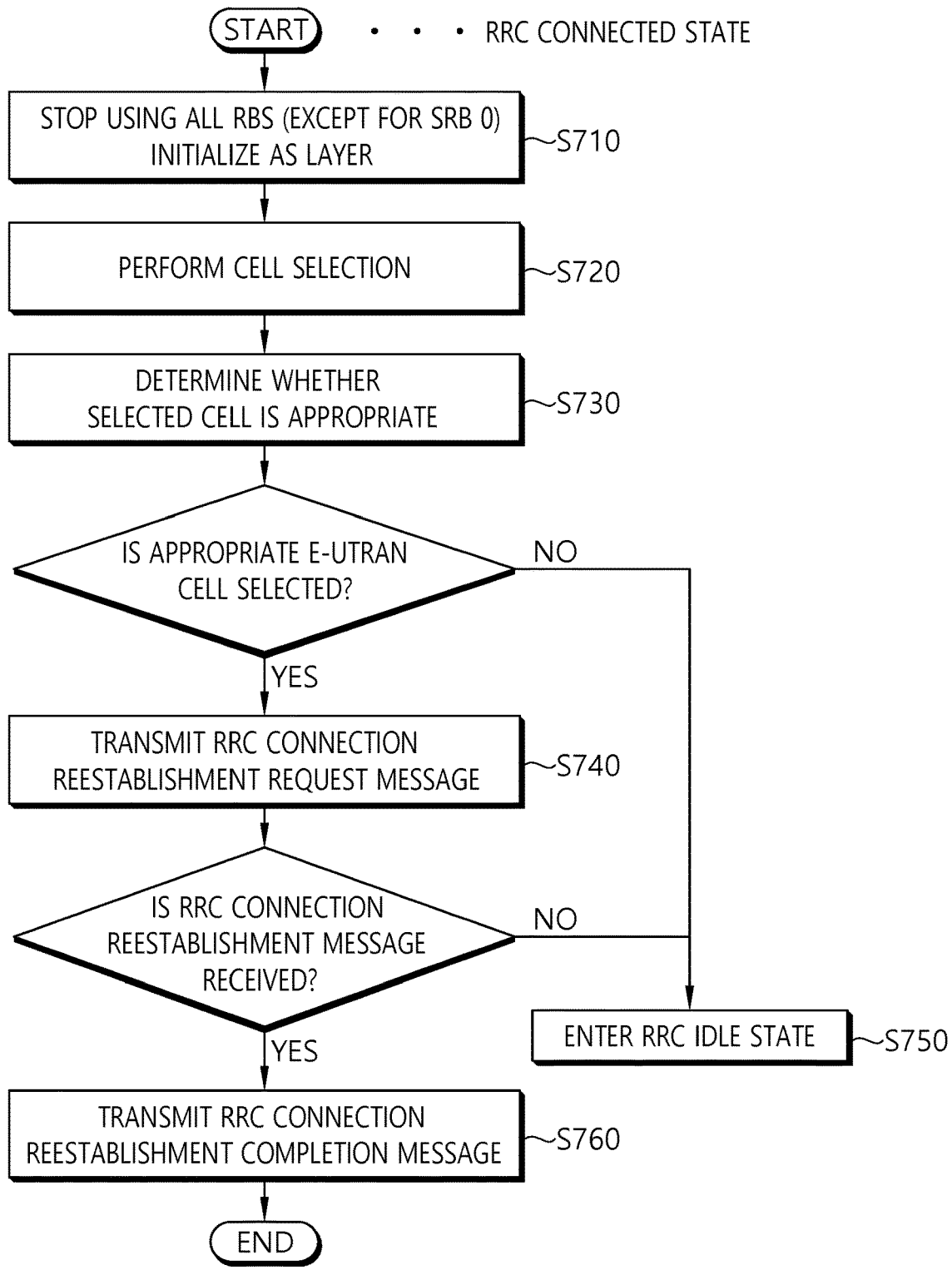
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
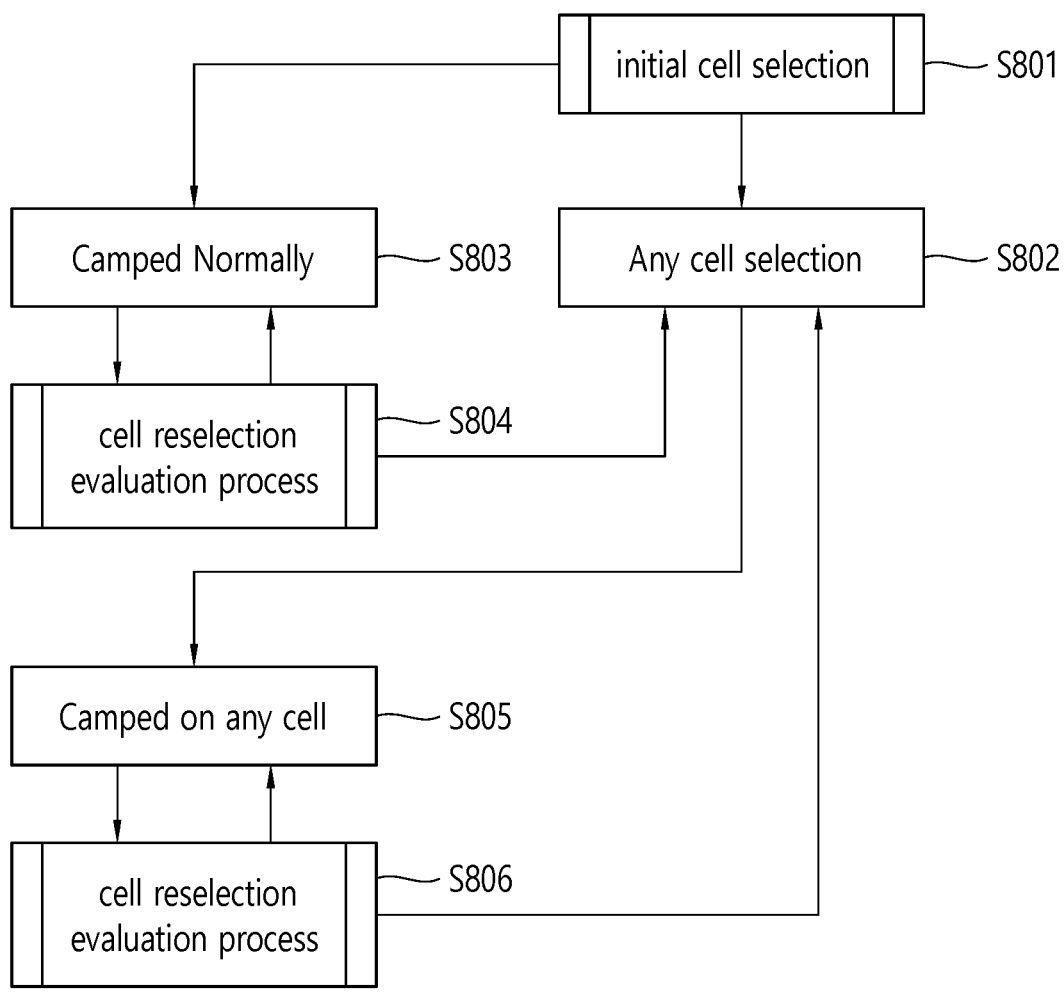
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
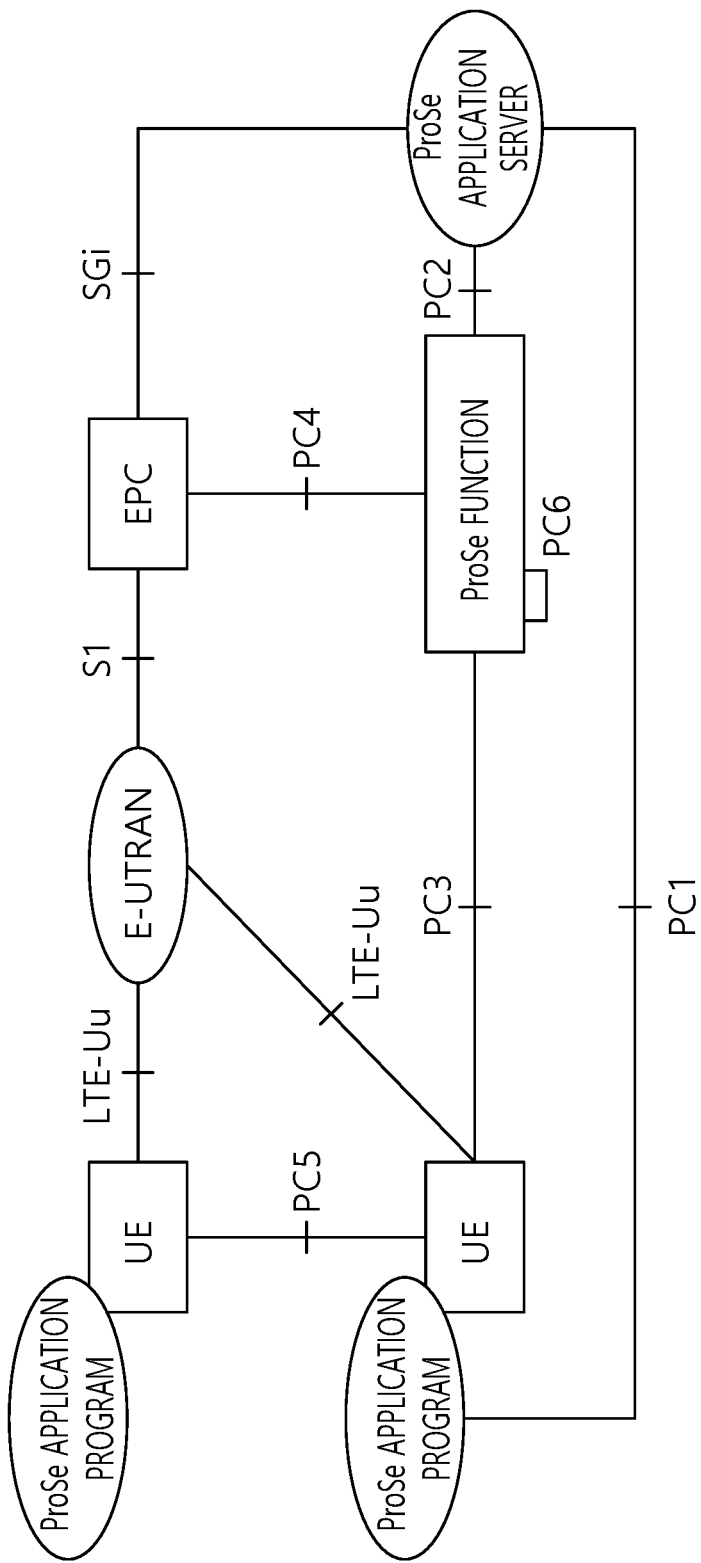
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
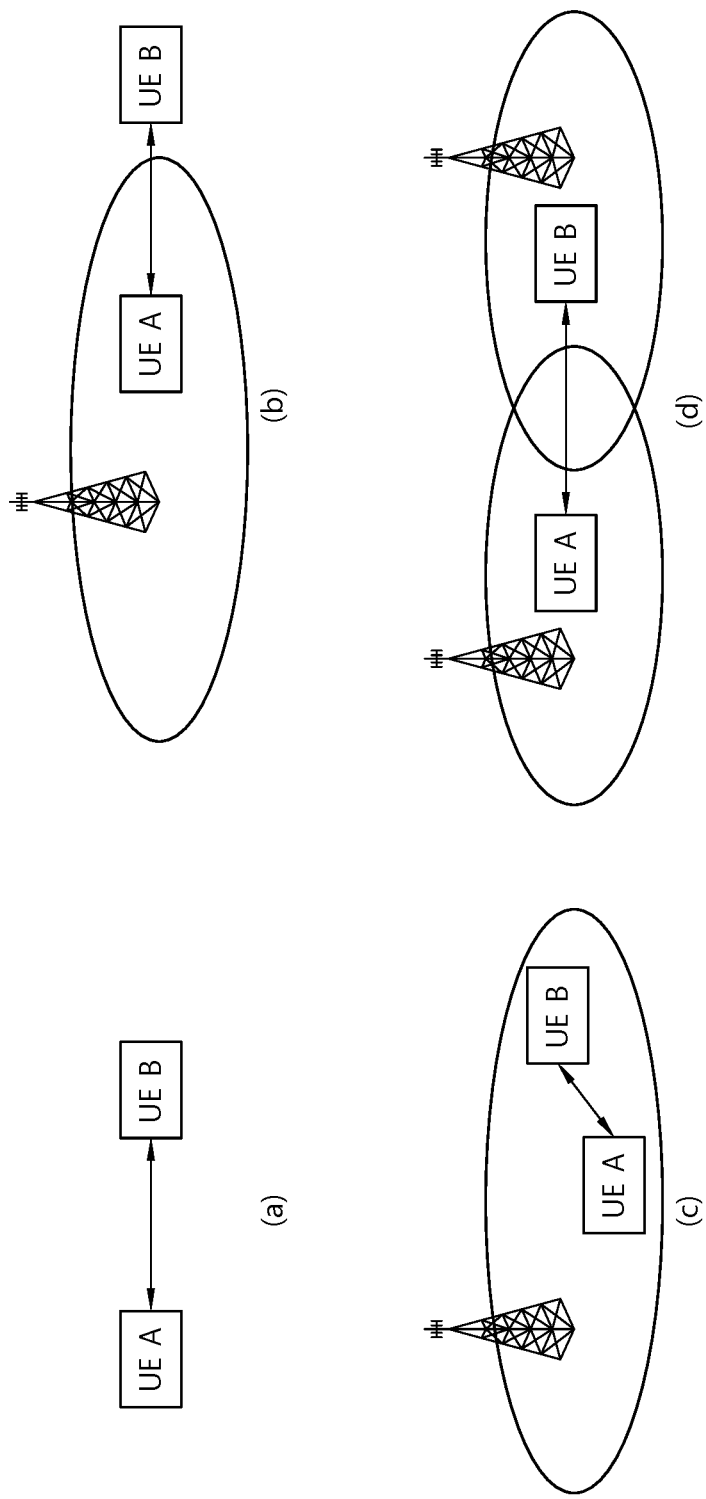
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
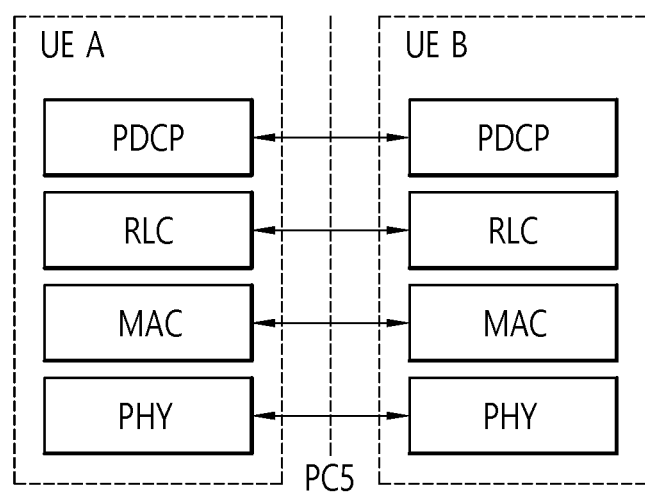
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
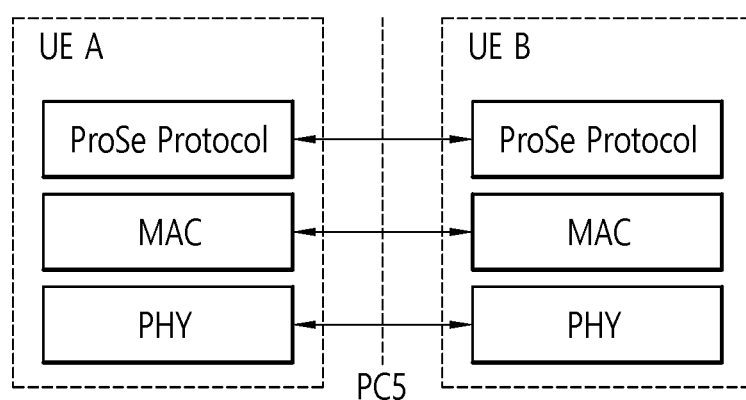
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, sidelink may mean a device to device interface for D2D communication and D2D discovery. The sidelink corresponds to the PC5 interface. A channel defined/used in the sidelink includes a physical sidelink control channel (PSCCH) and a control channel that broadcasts the most basic system information for the D2D communication includes a physical sidelink broadcast channel (PSBCH). Further, a channel for transmitting a D2D discovery signal may be defined as a physical sidelink discovery channel (PSDCH). A D2D synchronization signal may be called a sidelink synchronization signal (SLSS) or a D2D synchronization signal (D2DSS).

In an LTE-A system (Rel-12 and 13 or more), a D2D communication UE is configured to transmit both the PSBCH and the SLSS or transmit the SLSS. Further, in the LTE-A system, a sidelink RSRP (S-RSRP) for synchronization with another UE is newly defined in the D2D communication. That is, when the UEs intend to perform the D2D communication, the S-RSRP is measured, and as a result, only the UEs in which the S-RSRP is equal to or more than a specific value may synchronize with each other and the D2D communication may be performed. In this case, the S-RSRP may be measured from a demodulation reference signal (DM-RS) on the PSBCH. However, for a D2D relay operation, the S-RSRP may be measured from the DM-RS on the PSDCH.

Further, a UE outside cell coverage measures the S-RSRP based on the SLSS and/or the DM-RS of the PSBCH/PSCCH/PSSCH to decide whether the UE becomes a synchronization source that will perform the D2D relay operation.

Herein, the D2D relay operation is simply referred to as a relay operation and a UE that performs the D2D relay operation is referred to as a relay UE. The relay UE is positioned between a first UE and a second UE to relay a signal between the first and second UEs. Alternatively, the relay UE is positioned between another UE and a network (cell/base station) to relay the signal between the another UE and the network. Hereinafter, the relay UE is assumed as a UE that relays the signal between the another UE and the network.

Figure 13:
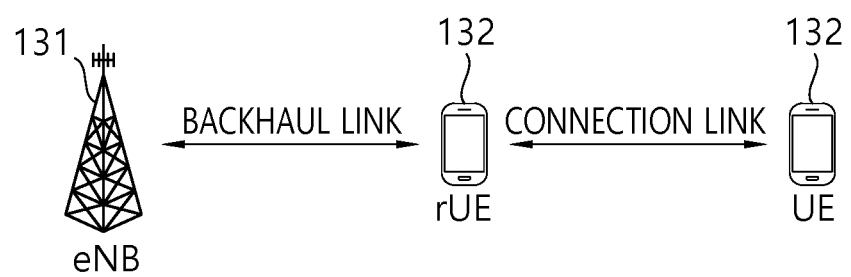
FIG. 13 illustrates a relay UE.

FIG. 13 illustrates a relay UE.

A relay UE 132 is a UE that provides network connectivity to a remote UE 133. The relay UE 132 serves to relay a signal between the remote UE 133 and a network 131. Even though the remote UE 133 is positioned out of coverage of a base station or in the coverage, the remote UE 133 may be a UE which is difficult to directly communicate with the base station.

The relay UE may transfer information received from the base station to a general UE or transfer information received from the general UE to the base station while maintaining a link with the base station and the link with the general UE (e.g., remote UE). In this case, a base station-relay UE link may be referred to as a backhaul link and a relay UE-remote UE link may be referred to as an access link. Further, a link for performing direct device-to-device communication without engagement in the base station may be defined as a D2D link or sidelink.

Figure 14:
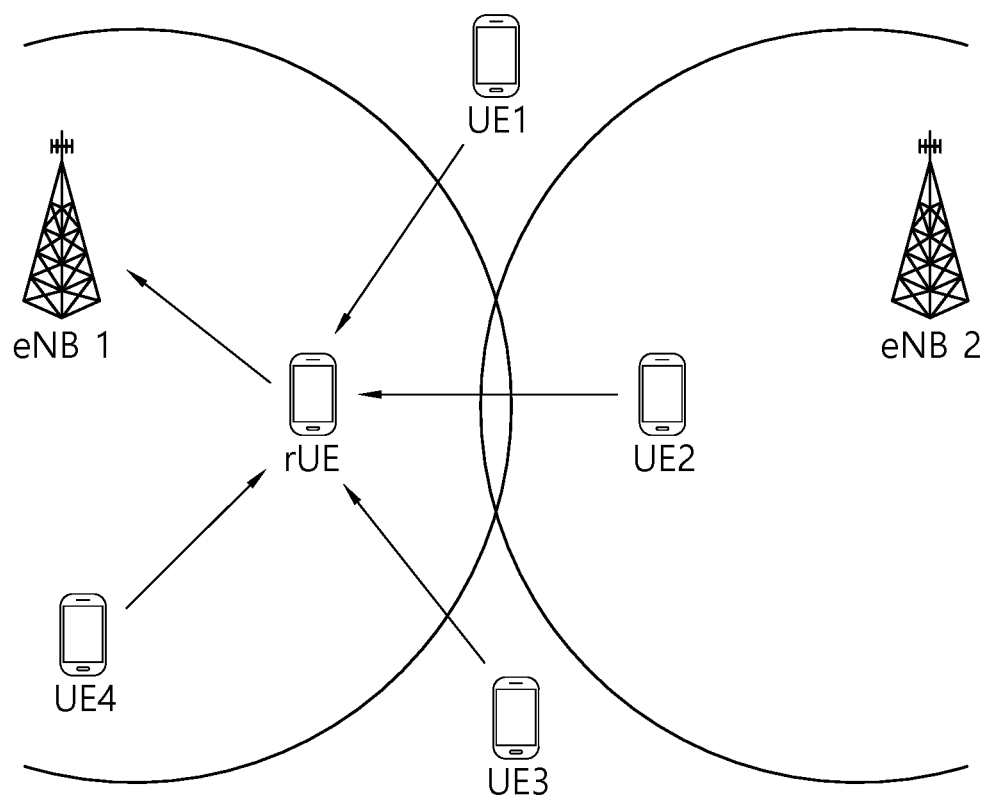
FIG. 14 illustrates a relationship between the relay UE and the remote UE.

FIG. 14 illustrates a relationship between the relay UE and the remote UE.

In FIG. 14, UE 1 and UE 3 are the UEs out of the coverage and UE 2 and UE 4 are the UEs in the coverage, and rUE means a relay UE that is configured to perform the relay operation. Herein, the UE 2 corresponds to the UE in the coverage with respect to a second base station (eNB2), but may correspond to the UE out of the coverage with respect to a first base station. The first base station (eNB1) may become a serving cell with respect to the rUE.

The rUE may be a UE configured as the rUE by indication of the first base station (eNB1) or coordination between the rUEs and the rUE broadcasts the discovery signal, and the like, and as a result, neighboring UEs may know existence of the rUE. The may receive the D2D signal from an in-network UE (i.e., UE 4) of the serving cell, and an in-network UE (i.e., UE 2) and outer-of-coverage UEs (i.e., UE 1 and UE 3) of an adjacent cell.

Hereinafter, a process in which the remote UE selects the relay UE will be described in detail. Further, when the remote UE selects the relay UE, it is described which operation/process is performed in protocol layers of the remote UE.

The process in which the remote UE selects the relay UE may generally include three steps and RAN assisted information and control information of different levels in respective steps may be provided. The remote UE may be in the coverage of the base station and out of the coverage and may influence a level controlled by the base station according to whether the remote UE is positioned.

Figure 15:
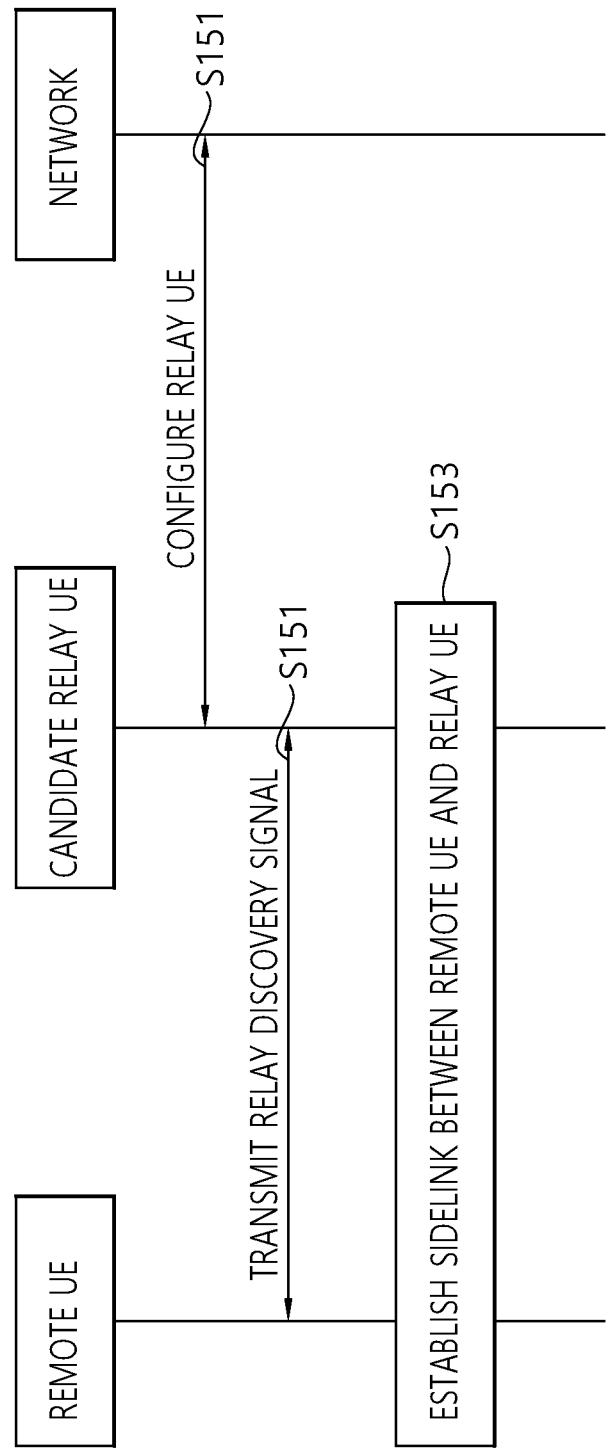
FIG. 15 illustrates 3 steps in which the remote UE selects a specific UE as the relay UE among candidate relay UEs.

FIG. 15 illustrates 3 steps in which the remote UE selects a specific UE as the relay UE among candidate relay UEs.

Referring to FIG. 15, the relay UE is configured between the candidate relay UE and the network (S151). This may be referred to step 1: Configuration of the relay UE.

In order for the candidate relay UE to participate in a discovery operation and to perform the relay operation between the remote UE and the network, it may be necessary for the candidate relay UE to be authenticated as a UE that plays a relay role from the remote UE to the network. Therefore, it may be necessary for the candidate relay UE to enter an RRC connected state and be permitted to operate as the relay UE from the network (base station).

In addition, there are two applicable methods for the discovery (referred to as relay discovery) transmitted by the relay UE. That is, there may be relay discovery transmission initiated from the relay UE and relay discovery transmission initiated from the remote UE. Which of the two methods is used may be configured/controlled by the base station.

That is, in order for the relay UE to participate in the relay discovery and serve as a relay device between the remote UE and the network, it may be necessary for the relay UE to enter the RRC connected state and receive permission from the base station.

Next, the candidate relay UE transmits a relay discovery signal to the remote UE (S152). This may be referred to step 2: Relay discovery assisted by the network.

In step 2, if the remote UE is out of cell coverage, the remote UE performs evaluation on the candidate relay UEs. When the remote UE is in the cell coverage, selecting the relay UE among the candidate relay UEs may be performed by the serving cell of the remote UE based on a measurement report received from the remote UE or the candidate relay UEs. Here, it is assumed that the remote UE is out of the cell coverage and the relay UE selection is performed by the remote UE.

As a selection criterion of the relay UE, parameters for connectivity (e.g., APN information) of the candidate relay UE and a measurement result (e.g., RSRP/RSRQ of the sidelink) may be used. A criterion for the remote UE to select the relay UE includes a higher layer criterion and a lower layer criterion and this will be described below in detail. For the remote UE in the cell coverage, the base station may configure the relay discovery to be initiated by the remote UE.

When the remote UE selects a specific candidate relay UE as the relay UE, the sidelink is established between the specific candidate relay UE and the remote UE (S153). This may be referred to as step 3: Establishment of a safety layer-2 link through a PC5 interface.

In step 3, a unicast connection is established between the remote UE and the relay UE through the PC5 interface. The process may include authentication and security configuration processes.

Now, the present invention will be described.

The UE may provide a side link service to another UE. The another UE may be the UE out of the cell coverage (network coverage) or the UE in the cell coverage. The sidelink service may be provided for enhancement of cellular coverage and the enhancement of D2D communication coverage.

The UE may serve as the relay between the network and another terminal. In this case, the UE serving as the relay may be referred to as the relay UE and the another terminal may be referred to as the remote UE.

Meanwhile, in the related art, it is assumed that a frequency at which the UE provides the relay service is the same as a frequency at which the D2D communication is provided. However, in a future technology, the frequency at which the UE provides the relay service may be different from the frequency at which the D2D communication is provided. For example, there is a case where the UE provides the relay service at a frequency other than a frequency at which the UE is interested in perform the D2D communication.

Figure 16:
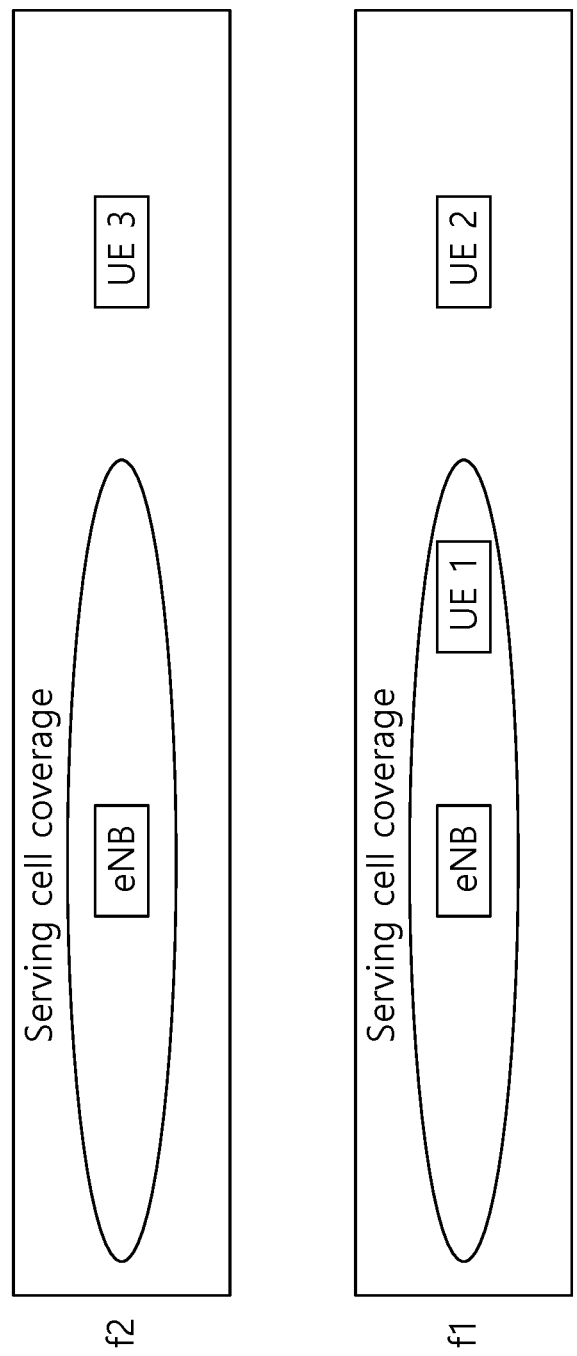
FIG. 16 illustrates an example in which the frequency at which the relay service is provided and a frequency at which the D2D operation is provided are different from each other.

FIG. 16 illustrates an example in which the frequency at which the relay service is provided and a frequency at which the D2D operation is provided are different from each other.

Referring to FIG. 16, a UE 1 is the UE within the cell coverage of the serving cell and UEs 2 and 3 are the UEs out of the cell coverage of the serving cell. The UEs 1 and 2 may perform a sidelink operation at a frequency f1. Meanwhile, the UE 1 may provide the relay service between the base station (eBN) and the UE 3 using the frequency f3.

Traffic for the relay service and traffic for the sidelink operation such as the D2D communication or D2D discovery may be different from each other. In particular, when the relay service is provided for a plurality of UEs, the traffic for the relay service may be much larger than the traffic for the sidelink operation. Then, the network may need to perform resource management for balancing between performance of a cellular operation and the performance of the sidelink operation considering the frequency at which the UE provides the relay service and the frequency at which the UE does not provide the relay service, and a load amount at each frequency.

The sidelink operation of the UE includes a sidelink operation confined between the UEs, such as performing the D2D communication and the D2D discovery between the first UE and the second UE and a sidelink operation including even an operation with the network together with the sidelink between the UEs, such as the first UE serving as the relay between the second UE and the network. Hereinafter, for easy description, the former will be referred to as an inter-UE sidelink operation and the latter will be referred to as a relay sidelink operation. The inter-UE sidelink operation is distinguished from the relay sidelink operation in that the inter-UE sidelink operation is irrespective to the relay operation.

It is necessary for the UE to announce one or more frequencies to perform the inter-UE sidelink operation to the network or another UE. Frequency information indicating the frequency to perform the inter-UE sidelink operation is referred to as 'freqInfo A'.

Further, it is necessary for the UE to announce one or more frequencies to perform the relay sidelink operation to the network or another UE. Frequency information indicating the frequency to perform the relay sidelink operation is referred to as 'freqInfo B'.

The frequency to perform the inter-UE sidelink operation and the frequency to perform the relay sidelink operation may overlap with each other. That is, the frequencies indicated by the 'freqInfo A' and the 'freqInfo B' may overlap with each other.

The UE may provide the relay service for other UEs. The other UEs may be the UEs out of the cell coverage.

The UE may announce updated frequency information to the network. The UE needs to update the 'freqInfo B'. The UE may update even the 'freqInfo A'.

For example, when the UE stops the relay service for another terminal at a specific frequency, the UE may need to update the specific frequency by excluding the specific frequency from the 'freqInfo B'. The UE reports the updated frequency information 'freqInfo B' to the network. The UE may update even the 'freqInfo A'.

In the case where the UE does not provide the sidelink operation or provides the relay sidelink operation, when the UE is triggered to transmit a message used to transmit the frequency information, the UE provides to the network the frequency information including information indicating the frequency to provide the relay sidelink operation. The frequency information may be included in the sidelink UE information and provided to the network.

Figure 17:
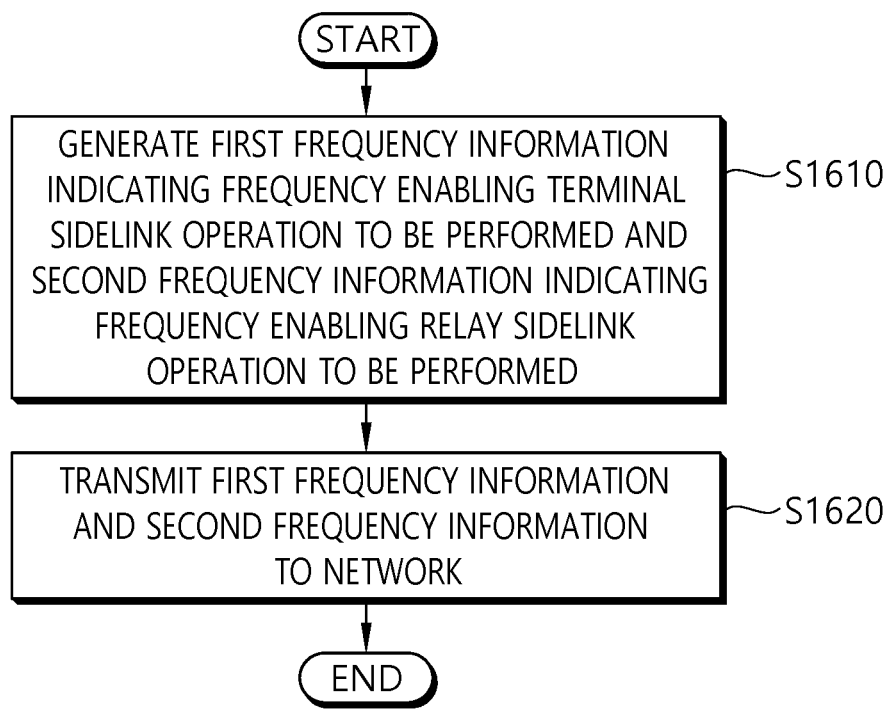
FIG. 17 is a diagram illustrating a method for performing a relay frequency reporting method by a UE according to an embodiment of the present invention.

FIG. 17 is a diagram illustrating a method for performing a relay frequency reporting method by a UE according to an embodiment of the present invention. The UE is assumed as the relay UE.

Referring to FIG. 17, the UE generates first frequency information indicating a frequency to perform a UE sidelink operation and second frequency information indicating a frequency to perform the relay sidelink operation (S1610). The first frequency information corresponds to the 'freqInfo A' and the second frequency information corresponds to the 'freqInfo B'.

The UE transmits the first frequency information and the second frequency information to the network (S1620). The UE may transmit the first and second frequency information to the network through an RRC message or to the network through sidelink UE information.

The following table illustrates one example of sidelink UE information.

TABLE 2

```
SidelinkUEInformation-r12-IEs ::=    SEQUENCE {
    commRxInterestedFreq-r12              ARFCN-ValueEUTRA-r9
OPTIONAL,
    commTxResourceReq-r12                 SL-CommTxResourceReq-r12
OPTIONAL,
    discRxInterest-r12                    ENUMERATED   {true}
OPTIONAL,
    discTxResourceReq-r12     INTEGER (1..63)        OPTIONAL,
    lateNonCriticalExtension              OCTET      STRING
OPTIONAL,
    nonCriticalExtension      SidelinkUEInformation-v13x0-IEs OPTIONAL
}
SidelinkUEInformation-v13x0-IEs ::= SEQUENCE {
    commTxResourceReqUC-r13               SL-CommTxResourceReq-r12
OPTIONAL,
    commTxResourceInfoReqRelay-r13    SEQUENCE {
        commTxResourceReqRelay-r13        SL-CommTxResourceReq-r12
OPTIONAL,
        commTxResourceReqRelayUC-r13      SL-CommTxResourceReq-r12
OPTIONAL,
        ue-Type-r13               ENUMERATED {relayUE, remoteUE}
    }                                                OPTIONAL,
    discTxResourceReq-v13x0       SEQUENCE {
        carrierFreqDiscTx-r13             INTEGER   (1..maxFreq)
OPTIONAL,
        discTxResourceReqAddFreq-r13  SL-DiscTxResourceReqPerFreqList-r13
OPTIONAL
    }                                                OPTIONAL,
    discTxResourceReqPS-r13               SL-DiscTxResourceReq-r13
OPTIONAL,
    discRxGapReq-r13                      SL-GapRequest-r13
OPTIONAL,
    discTxGapReq-r13                      SL-GapRequest-r13
OPTIONAL,
    discSysInfoReportFreqList-r13         SL-DiscSysInfoReportFreqList-r13
OPTIONAL,
    nonCriticalExtension                  SEQUENCE     { }
OPTIONAL
}
SL-CommTxResourceReq-r12 ::=    SEQUENCE {
    carrierFreq-r12                       ARFCN-ValueEUTRA-r9
OPTIONAL,
    destinationInfoList-r12    SL-DestinationInfoList-r12
}
```

The sidelink UE information is a message used for the UE to announce information related with the sidelink to the base station. 'commRxInterestedFreq' indicates a frequency at which the UE is interested in receiving the sidelink communication and 'commTxResourceReq' indicates a frequency at which the UE is interested in transmitting the sidelink communication and a transmission destination of which requests the network to allocate a dedicated resource. 'discRxInterest' indicates a frequency at which the UE is interested in monitoring the discovery signal. The fields may become an example of the 'freqInfo A'.

As described above, the 'freqInfo A' is the frequency information indicating the frequency to perform the inter-UE sidelink operation and the 'freqInfo B' is the frequency information indicating the frequency to perform the relay sidelink operation. In Table 2, 'commTxResourceReqRelay' indicates the frequency to perform the relay sidelink operation and may become an example of the 'freqInfo B'.

Figure 18:
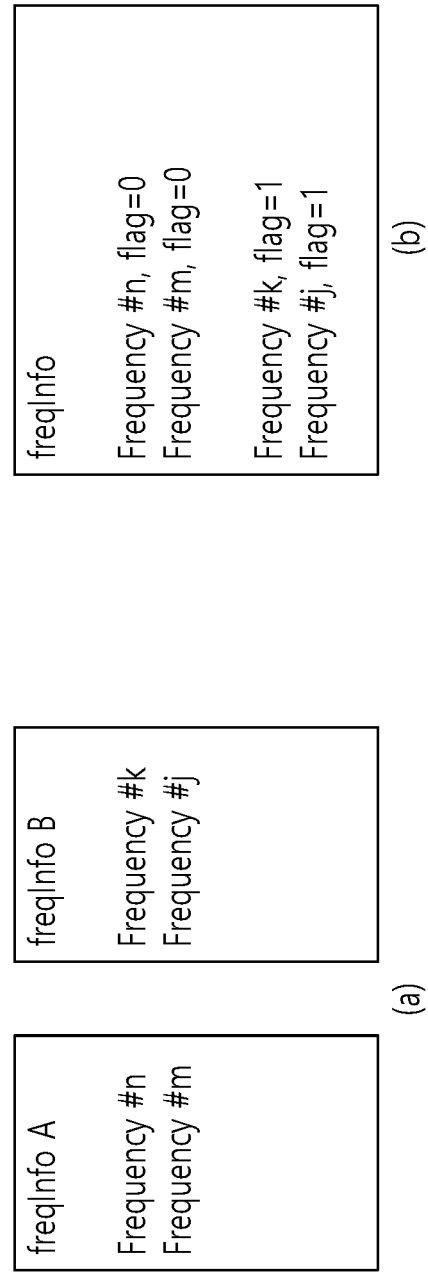
FIG. 18 illustrates a method in which the UE signals the first and second frequency information.

FIG. 18 illustrates a method in which the UE signals the first and second frequency information.

Referring to FIG. 18, the 'freqInfo A' corresponds to the first frequency information and indicates the frequency to perform the UE sidelink operation. The 'freqInfo B' corresponds to the second frequency information indicating the frequency to perform the relay sidelink operation. One of the following methods may be used as a signaling method for announcing the frequencies included in the 'freqInfo A' and/or 'freqInfo B'. By the following method, the network may know whether the corresponding frequency is included in the 'freqInfo A' or the 'freqInfo B'.

The UE may separately signal a frequency list for the 'freqInfo A' and the frequency list for the 'freqInfo B' as illustrated in FIG. 18(a). The frequency list for the 'freqInfo A' may include frequencies # n and # m, and the frequency list for the 'freqInfo B' may include frequencies # k and # j.

Alternatively, the UE may transmit one frequency list including all of frequencies included in the 'freqInfo A' and frequencies included in the freqInfo B' as illustrated in FIG. 18(b) and announce that the frequencies included in the frequencies included in the 'freqInfo B' among the frequencies included the one frequency list are the frequencies included in the 'freqInfo B' through additional information such as a flag. In FIG. 18(b), frequencies # k and # j are the frequencies to perform the relay sidelink operation and a flag value is expressed as 1 to announce that the frequencies are the frequencies which may be used for the relay sidelink operation to the base station.

The frequency information may be transferred to a target cell during handover preparation.

Meanwhile, the network (base station) that receives the frequency information may perform appropriate scheduling considering the frequency information. That is, the base station may decide an appropriate scheduling policy considering the frequency information and a capability of the UE, for example, whether the cellular operation and the sidelink operation may be simultaneously performed.

For example, the base station may impose a scheduling restriction for more cellular communication to the UE based on the 'freqInfo B'. The purpose is to prevent an influence exerted on the relay operation provided by the UE. Further, the base station considers the 'freqInfo A' and preferentially considers the 'freqInfo B' and may not impose the scheduling restriction for the cellular communication or may impose a smaller restriction to the sidelink operation not related to the relay operation provided by the UE.

The frequency information may be used even for deciding a management policy for a secondary cell by the base station. For example, in order to assist the relay operation of the UE based on the frequency information, the base station may decide which frequency the base station configures in the secondary cell or for which frequency the base station releases the configuration.

Figure 19:
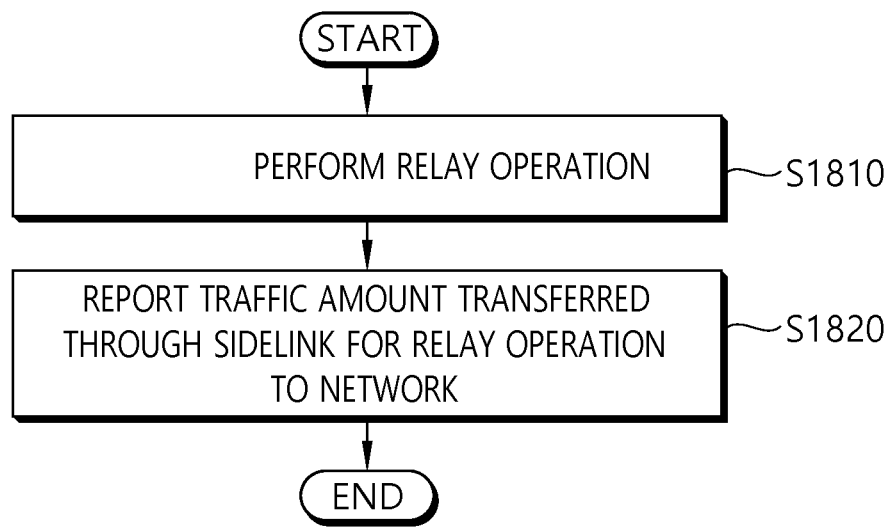
FIG. 19 is a diagram illustrating an operation method of the relay UE according to another embodiment of the present invention.

FIG. 19 is a diagram illustrating an operation method of the relay UE according to another embodiment of the present invention.

Referring to FIG. 19, after the relay UE performs the relay operation (S1810), the relay UE reports the amount of traffic transferred through the sidelink for the relay operation to the network (S1820).

That is, the UE may report the amount of traffic transmitted through the sidelink to the network for the relay service.

It may be indicated by the configuration of the network that the terminal reports the traffic transferred through the side link for the relay operation. The configuration may be made to instruct the UE to periodically report the traffic or to perform reporting when a specific event is satisfied. An example of the event may be an event in which the UE triggers reporting when the amount of the traffic is more than a threshold.

The amount of the traffic may include at least one of 1) a running average value of the traffic, 2) the number of sidelink grants used for the relay service, 3) the number of physical resource blocks (PRBs), 4) the number of transport blocks used for the relay service, 4a) the number of new transport blocks used for the relay service, 5) the number of IP packets used for the relay service, and 6) the number of PDCP SDUs used for the relay service. The UE calculates the traffic during specific time duration. When the UE performs periodic reporting, the time duration may be a predetermined fixed time. When the UE performs the reporting based on the event, the time duration may be defined as a time point at which the event is satisfied from the time of performing the previous reporting. When initial reporting is performed, a start of the time duration may be defined as the time when the UE receives a reporting configuration. The network is capable of instructing what traffic amount the UE reports.

In configuring/calculating the traffic to be reported by the UE, the amount of the traffic may be calculated with respect to the link from the relay UE to another UE or the link from another UE to the relay UE. That is, the relay UE calculates the amount of traffic based on the traffic transmitted by the relay UE or calculates the amount of traffic based on the received traffic. Alternatively, the UE may calculate and report each of the amount of the received traffic and the amount of transmitted traffic. When the relay UE knows a priority of relay traffic, it is possible to report the traffic amount by priority. ProSe Per Packet Priority (PPPP) is an example of the priority. It is possible for the network to indicate a configuration unit of traffic amount reporting as described above.

In configuring the network with respect to the reporting of the traffic transferred through the sidelink, the network may be configured to report to the UE the amount of specific traffic among the traffic transferred for the relay operation. For example, the network may be configured to report to the UE the amount of the transmitted traffic with a remote UE identified by a specific Layer 2 user ID or a remote UE group identified by a specific Layer 2 group ID. As another example, the network may be configured to report to the UE the amount of traffic corresponding to a specific priority. ProSe Per Packet Priority (PPPP) is an example of the priority.

Figure 20:
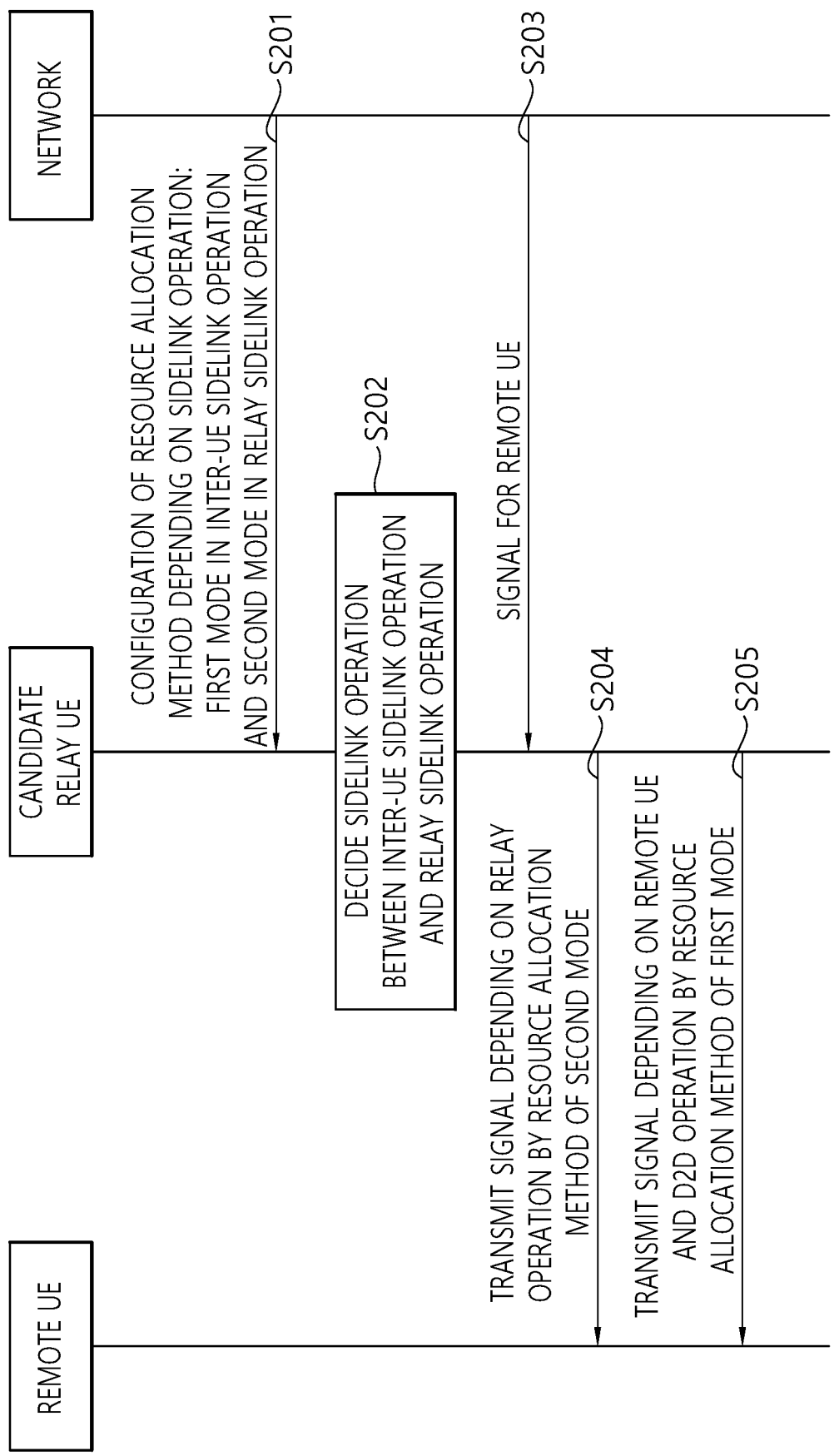
FIG. 20 is a diagram illustrating a relay n operation method of the relay UE according to yet another embodiment of the present invention.

FIG. 20 is a diagram illustrating a relay n operation method of the relay UE according to yet another embodiment of the present invention.

Referring to FIG. 20, the network may a resource allocation scheme according to the sidelink operation to the relay UE (S201). A first mode may be configured in the inter-UE sidelink operation and a second mode may be configured in the relay sidelink operation. The first mode may be a resource allocation scheme in which the UE is allocated a resource pool from the base station and an actual resource for data transmission is selected by the UE itself in the resource pool. The second mode may be a resource allocation scheme for transmitting data using resources scheduled by the base station. In the second mode, the UE is distinguished from the first mode in that there is no process of selecting the resource. The network may configure different resource allocation methods for the inter-UE sidelink operation and the relay sidelink operation. For example, the network may configure the resource allocation method of the first mode for the inter-UE sidelink operation and the resource allocation method of the second mode for the relay sidelink operation.

The relay UE determines the sidelink operation to be performed between the inter-UE sidelink operation and the relay sidelink operation (S202).

When the relay UE receives a signal for the remote UE from the network (S203), the relay UE transmits a signal according to the relay operation in the resource allocation method of the second mode (S204). That is, when the relay UE receives a signal transmitted from the network to the remote UE as a target, the relay UE relays the signal to the remote UE.

The relay UE may transmit the signal irrelevant to the relay operation to the remote UE through the resource allocation method of the first mode (S205). That is, the relay UE may transmit a signal according to the D2D operation to the remote UE in the resource allocation method of the first mode.

That is, the relay UE applies the resource allocation method of the second mode when the relay UE intends to transmit data through the sidelink for the relay service, that is, for the relay sidelink operation and the resource allocation method of the first mode when the relay UE intends to transmit the data through the sidelink, which is not for the relay service, that is, for the UE sidelink operation.

The method may also be applied even to the sidelink operation at different frequencies. For example, the UE may perform the sidelink operation by using different resource allocation methods at different frequencies such as performing data transmission using the resources scheduled by the base station at the first frequency and performing data transmission using resources selected by the UE in the resource pool at the second frequency.

Further, the method may also be applied even to the sidelink operations served by different applications. For example, the UE may perform the sidelink operation by using different resource allocation methods in different applications such as performing the data transmission using the resources scheduled by the base station in a vehicle to vehicle application and performing the data transmission using the resources selected by the UE in the resource pool in other applications. The other application may be an application that requires a stricter quality of service (QoS) than the vehicle to vehicle application.

Meanwhile, when the UE is interested in transmitting the discovery signal at a serving frequency, the UE may transmit the discovery signal by using a ProSe configuration corresponding to the secondary cell. In order to announce that the UE is interested in transmitting the discovery signal and request a transmission resource to be used for transmitting the discovery signal, the UE may perform one of the following operations with respect to the network.

The targeted frequency of the non-serving cell and a physical cell ID of the non-serving cell are included in the sidelink UE information to be transmitted to the network. That is, a frequency at which the non-serving cell to which the UE intends to transmit the discovery signal is positioned and an ID of the non-serving cell are included in the sidelink UE information and transmitted to the network.

Alternatively, the UE may announce a serving cell index or announce the frequency of the serving cell as a part of a 'transmission resource request' of requesting the transmission resource for transmitting the discovery signal.

Alternatively, the UE may announce a global cell ID of the cell to which the UE intends to transmit the discovery signal to the network.

Next, the UE may be interested in transmitting the discovery signal in the non-serving frequency. That is, the UE may intend to announce the discovery signal in the non-serving frequency. In this case, the UE may transmit the discovery signal by using the ProSe configuration corresponding to the cell selected for the ProSe operation (that is, transmission of the discovery signal) in the non-serving frequency.

The UE may operate as follows in order to announce that the UE is interested in transmitting the discovery signal and request the resource for transmitting the discovery signal.

The UE may announce to the network both the frequency of the non-serving cell in which the UE intends to transmit the discovery signal and the physical cell ID of the non-serving cell. That is, the frequency in which the non-serving cell to which the UE intends to transmit the discovery signal is positioned and the ID of the non-serving cell are included in the sidelink UE information and transmitted to the network.

Alternatively, the UE may announce the global cell ID of a targeted cell positioned in the frequency in which the UE intends to transmit the discovery signal.

The UE may announce that the cell selected for the ProSe operation is changed to the network through the sidelink UE information. The UE may announce the selected new cell to the network.

The UE suspends the ProSe operation when the resource corresponding to the selected new cell is not usable. When the resource corresponding to the selected new cell is usable, the UE performs the ProSe operation by using the resource corresponding to the selected new cell.

The UE performs in-frequency cell reselection in the frequency in which the UE is interested in transmitting the signal depending on the ProSe operation to select the new cell in the same frequency. When the UE already announces the cell selected for the ProSe operation to the network and is not interested in the ProSe operation even in any cell of a specific frequency in which the selected cell is positioned, the UE may announce that the UE is not interested in transmitting the discovery signal in the cell any longer to the network through the sidelink UE information. In this case, the UE may delete the specific frequency in the list of the frequencies in which the UE is interested in transmitting the discovery signal.

When the base station receives the sidelink UE information for announcing that the UE is interested in transmitting the ProSe from the UE, if the base station knows transmission resource pool parameters for the cell of the frequency, which announce that the UE is interested in transmitting the discovery signal, the base station may signal the transmission resource pool parameters to the UE. In this case, the UE may transmit the discovery signal in another frequency by using the transmission resource pool parameter.

That is, the base station may transmit the transmission resource pool parameter configured with respect to the cell of the frequency in which the UE is interested in the ProSe operation through a dedicated signal for the UE as auxiliary information for the UE.

When the base station may not know the transmission resource pool parameter for the cell of another frequency in which the UE is interested in transmitting the discovery signal, the base station may not consider transmission of the discovery signal in the another frequency in uplink scheduling for the UE. In this case, whenever the uplink scheduling by the cellular communication overlaps with the transmission of the discovery signal, the UE may need to drop the transmission of the discovery signal based on a principle to prioritize the cellular communication. However, when the UE operates as such, performance of a D2D discovery operation in the another frequency may be degraded.

Meanwhile, which RRC state (herein, the RRC state may include the RRC connected state and the RRC idle state as described above) aims at supporting the discovery on the non-serving cell and the secondary cell needs to be considered may become an issue. It may be desirable to support the discovery on the non-serving cell and the secondary cell for both RRC states in order to permit a flexible network configuration and a continuous terminal ProSe operation.

The RAN may support announcement of ProSe direct discovery on the non-serving cell and/or the secondary cell in the RRC idle and RRC connected states.

A list of PLMNs in which the ProSe direct discovery is permitted may be different from the list of PLMNs in which the cellular operation is permitted. Whenever we discuss the announcement on a non-primary cell (non-PCell), it may be inferred or guaranteed that the announcement means that a discovery announcement occurs only on the cell of the PLMN which is the ProSe direct discovery which is authorized.

The announcement of the ProSe direct discovery on the non-serving cell and/or the secondary cell may be limited to cells associated with the PLMN(s) in which the ProSe direct discover announcement is authorized.

Reception of the ProSe direct discovery on the non-serving cells at another frequency is not limited in 3GPP Rel-12.

<Enhancement for RRC Idle>

It is assumed that the UE in the RRC idle camps on cell 1 of current frequency 1 and the UE is interested in the announcement discovery on cell 2 of frequency 2.

Approach 1: The UE changes the primary cell by a modified inter-frequency cell reselection method and in this case, the UE performs the discovery announcement on the new primary cell.

Approach 2: The terminal performs the announcement discovery on the inter-frequency cell.

Approach 1 is based on Rel-12 where the discovery announcement is permitted only on the primary cell. The UE may need to be permitted to perform frequency prioritization to change the primary cell of the UE to the inter-frequency cell supporting the discover announcement. The approach (i.e., approach 1) is simplified and in the approach, required enhancement (e.g., permitting the frequency prioritization to be sufficient) is minimized. On the other hand, a side effect of the approach (i.e., approach 1) is that when a plurality of frequencies supporting the discovery announcement exists, it may be impossible for the network to control the UE to stay at the frequency for the discovery announcement as frequency selection among frequencies until the UE executes the discovery (i.e., the camping road described above are almost close to random among the frequencies). As another drawback, the approach (i.e., approach 1) may not have any advantage in terms of a UE capacity in performing concurrent operation of cellular and discovery.

Approach 2 is based on elimination of the restriction of the Rel-12 (i.e., approach 2 is based on departing from a restriction factor of the Rel-12). With such mitigation, the UE may perform the announcement discovery on the non-primary cell in an idle period of the current primary cell even when there is no additional extension. For a UE that may not simultaneously perform the discovery and cellular operations, when the discovery announcement is performed without any extension on the non-primary cell, the execution (i.e., the discovery announcement is performed without particular extension) may be expected to be worse than an execution quality of the discovery announcement on the primary cell. The reason that the execution becomes worse may be 1) a case where the current primary cell may not know a cell in which the UE is interested in the announcement discovery (that is, a case where the current primary cell may not know which frequency is the frequency in which the UE is interested in the announcement discovery) and 2) a case where the current primary cell may not know an accurate time of a discovery opportunity on an interested cell (that is, interested frequency) in which the UE is interested in the announcement discovery. Due to a defect like the knowledge mentioned here, it is not possible for the UE to take an action such as a cellular scheduling restriction, for a benefit of the discovery announcement on the non-primary cell unless any additional extension is introduced.

Based on the analysis, since an overall viewpoint of idle mode UE management is important, we assume that approach 2 needs to be a reference value for the extension to the RRC idle mode and approach 2 does not affect a camping operation of the UE in the idle mode. It is noted that transmission of direct communication on the secondary cell or non-serving cell is already supported in the Rel-12. It seems desirable that the UE operations of the direct communication and the discovery may be controlled at any time as proposed in approach 2.

Approach 2 is suitable as the reference value. That is, on the non-primary cell, the discovery announcement is permitted. In addition to approach 2, approach 1 has a clear advantage particularly when it is impossible to simultaneously perform the cellular and discovery operations. When reselection to another cell (e.g., a cell of a lower priority) is permitted, the UE may avoid frequency RF readjustment that the announcement discovery on the inter-frequency is required.

Approach 1 may be supported in the extension for the RRC idle mode.

In order to support all of the proposals, it is necessary to discuss the following additional issues.

Authority configuration of transmission resource pool corresponding to non-primary cell (for approach 2)

Frequency prioritization (for approach 1)

<Supply of Transmission Resource Pool Corresponding to Non-Primary Cell>

When there is no auxiliary information for the announcement on the non-serving cell, the UE needs to acquire system information block (SIB) 19 from a target non-serving cell. In addition, acquisition of the SIB 19 requests the UE to access a master information block (MIB) before SIB 1. In order to avoid an inefficient UE operation described above, it may be considered that the serving cell transmits the auxiliary information for announcement assistance to the UE. In this case, examples of the auxiliary information may include txParameters included in cp-length, discPeriod, numRetx, numRepetition, tf-ResourceConfig, and SL-DiscResourcePool.

The cell may signal a transmission pool parameter corresponding to the cell of another frequency in the SIB 19.

The transmission resource allocation of the non-primary cell may require RSRP-based resource pool selection. The UE may then need to know a measured bandwidth according to the resource pool selection based on RSRP measurement of the cell. During frequency information reselection, the frequency information may include a frequency in which the UE is interested in the announcement discovery and the UE may know the bandwidth measurement of the cell from SIB 15 of the primary cell. However, when the UE is interested in the announcement discovery on a frequency that is not listed in the frequency information reselection, the UE may need to additionally announce inform the measured bandwidth. As considered herein, when the supplied resource affects the frequency that is not listed in reselected frequency information, the cell needs to signal the measured bandwidth in the SIB 19 as part of the auxiliary information.

The cell may signal the auxiliary information for the announcement in the SIB 19. In this case, the auxiliary information may include the measured bandwidth.

In order to support the discovery announcement (i.e., announcement on the inter-frequency) on the non-primary cell, the UE first needs to select the cell to be used for the discovery announcement. It is desirable that the UE follows a principles applied to the ProSe direct communication that perform additional intra-frequency reselection based on additional measurement. When the RSRP based on the transmission resource pool selection is for the announcement on the non-primary cell, the measurement may also be used. The UE may need to perform the measurement on the cell. According to a current measurement requirement, it is not necessary for the UE to make measurement on a cell with a lower priority than the primary cell. Without additional measurement beyond the current requirement, the discovery announcement on the non-primary cell may often be delayed at every discovery cycle in theory.

When the UE in the RRC idle is interested in the announcing discovery on the inter-frequency on the non-primary cell, the UE does not look at the priority of the frequency of the UE and performs the measurement on the cell (i.e., actually frequency).

Additional measurement defined for the ProSe direct communication may be applied for measurement on the frequency of the non-primary cell where the UE in the RRC idle s interested in ProSe direct discovery.

Upon receipt of the resource pool parameter and the ancillary information corresponding to the non-primary cell, the UE does not read the MIB, the SIB 1 and the SIB 19 of the cell, but may use other information and resource pools for the announcement on the frequency.

<Frequency Prioritization>

The UE may be permitted to perform frequency prioritization for a discovery announcement purpose.

Only when the UE is permitted to camp on a cell of a prioritized frequency, the frequency prioritization may be permitted.

Only for cells associated with the PLMN(s) in which the ProSe direct discovery announcement is authorized, the frequency prioritization may be permitted.

<Enhancement for RRC Connection>

There are three scenarios which may be considered with respect to the discovery announcement in the RRC connected state.

Announcement on primary cell

Announcement on secondary cell

Announcement on non-serving cell (e.g., inter-frequency cell)

Herein, a first scenario is supported in the Rel-12 and two remaining scenarios need to be discussed as below. A first discussion is whether transmission is permitted on the non-secondary cell while the UE is already configured with the secondary cell on a carrier frequency. Our view is that it is inappropriate to permit the announcement on the non-secondary cell in a secondary carrier. Otherwise (i.e., when the announcement on the non-secondary cell is permitted on the secondary carrier), it is expected that interference will occur together with uplink of the secondary cell.

For the discovery announcement on the serving frequency, the UE is permitted to perform the announcement only on the serving cell (secondary cell or primary cell).

A similar discussion arises for the discovery announcement on the non-serving frequencies. As a result, it should be decided whether it is permitted to announce the discovery on a best-ranked cell on the non-serving frequency. As mentioned, in order to take the ProSe direct communication, the UE for the ProSe direct discovery announcement on the non-serving frequency may make it a principle to use the best-ranked cell on the frequency. Then, accompanied requirements to be introduced below are needed.

When the UE in the RRC connected state is interested in the announcement discovery on the non-serving cell (i.e., the cell on the inter-frequency cell), the measurement may be performed on the frequency of the cell even though a measurement target is not configured with respect to the frequency.

Additional measurement defined for the ProSe direct communication may be applied to measurement on the frequency of the non-primary cell where the UE in the RRC connected state is interested in the ProSe direct discovery.

The additional measurement defined for the ProSe direct communication can be applied to the measurement on the frequency of the non-primary cell.

When the UE enters the RRC connected state, the UE transmits the sidelink UE information to indicate reception, transmission or transmission/reception interest of the discovery.

The UE may be interested in announcing the discovery on a specific secondary cell. In this case, the UE may indicate, for example, the serving cell index as a part of the transmission resource request or the UE may indicate the carrier frequency of the serving cell. Assuming that a difference in signaling size is small, it may be desirable to perform a general operation for both processes.

The UE may indicate the list of the carrier frequencies in which the UE is interested in the announcement in the sidelink UE information. In this case, the indicated frequency may be the serving frequency and the non-serving frequency.

The UE may indicate the list of the carrier frequencies in which the UE is interested in the announcement in the sidelink UE information.

The restriction on the proposed announcement may also be applied to the triggering of the sidelink terminal information on the primary or secondary cell for the discovery announcement on the serving frequency.

The UE may be interested in announcing the discovery on a specific secondary cell. In this case, the UE may indicate, for example, the serving cell index as a part of the transmission resource request or the UE may indicate the carrier frequency of the serving cell. The UE may be interested in announcement on the non-serving cell of the inter-frequency. In this case, the UE may indicate the carrier frequency of the target non-serving cell. When the difference in signaling size is assumed to be small, it is desirable to have a common operation for both cases.

The UE has a capability in indicating the list of the carrier frequencies in which the UE is interested in the announcement in the sidelink UE information.

When the base station is aware of resource pool parameter transmission for the cell of the frequency in which the UE is interested in the announcement discovery, it is natural that the UE signals the resource pool parameter to the UE which may announce the discovery to another frequency by using the signaled resource pool parameters. This is the case where the UE is interested in the announcement on the secondary carrier.

The cell may signal the dedicated signaling transmission resource pool parameters and the auxiliary information corresponding to the cell of another frequency.

When the base station is not aware of the transmission resource pool parameter for the cell of another frequency in which the UE is interested in announcing the discovery, the base station may not consider that the transmission resource pool parameter is for uplink scheduling of an interested UE announcement operation on another frequency to the UE and then, whenever the discovery announcement and the uplink scheduling overlap with each other, the UE needs to drop the discovery announcement based on a principle of cellular prioritization, which causes performance degradation of the discovery announcement on the frequency.

One solution is to allow the UE to report the transmission resource pool parameter corresponding to the cell of the frequency in which the UE is interested in announcing the discovery. For example, when the UE considers that the serving cell of the UE does not know the transmission resource pool of another cell in which the UE is interested in the announcement discovery, for example, upon the transmission resource request, the UE may provide the report in the sidelink UE information.

It is possible to consider introducing a UE reporting mechanism in which the UE reports the transmission resource pool parameter corresponding to the cell of another frequency to the serving cell of the UE together with time information.

<Capability of UE>

The current UE only reports a band supported for the discovery to the base station and does not report information on the concurrent operation of the D2D and the cellular. This is acceptable only when the discovery announcement is restricted as in the Rel-12. However, when we aim to support the discovery on the secondary carrier or the non-serving carrier, capabilities which are present may not be sufficient. For example, the base station may not know whether restricting cellular uplink scheduling, by assisting the discovery announcement on another frequency is applied. If a focus of the discussion is confined to the discovery transmission, a useful knowledge from the base station side is whether the UE simultaneously supports the discovery transmission and the cellular transmission on a band combination in which the UE is interested.

UE capability signaling for the discovery is enhanced by enabling the simultaneous operation of the discovery transmission and the cellular transmission for each band combination.

Figure 21:
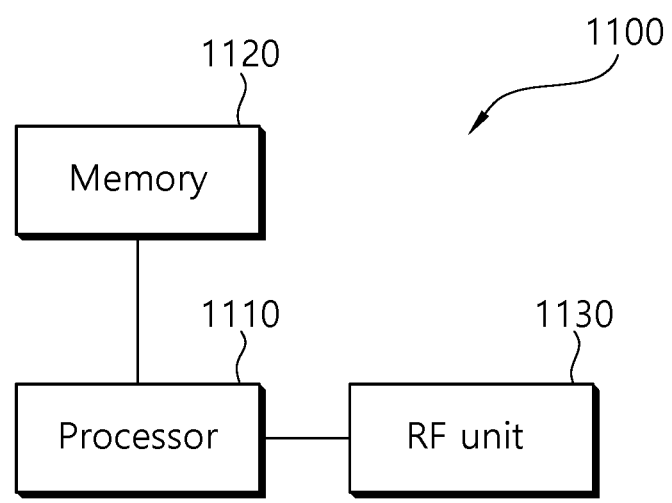
FIG. 21 is a block diagram illustrating a UE in which the embodiment of the present invention is implemented.

FIG. 21 is a block diagram illustrating a UE in which the embodiment of the present invention is implemented.

Referring to FIG. 21, the UE 1100 includes a processor 1110, a memory 1120, and a radio frequency (RF) unit 1130. The processor 1110 implements a function, a process, and/or a method which are proposed. The RF unit 1130 is connected with the processor 1110 to transmit and receive a radio signal.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

What is claimed is:

1. A method for transmitting user equipment (UE) sidelink frequency information and relay sidelink frequency information in a wireless communication system, the method performed by a UE and comprising:
   generating the UE sidelink frequency information and the relay sidelink frequency information; and
   transmitting, to a network, the UE sidelink frequency information and the relay sidelink frequency information,
   wherein the UE sidelink frequency information is information for a UE sidelink frequency on which the UE performs a sidelink operation between the UE and another UE,
   wherein the relay sidelink frequency information is information for a relay sidelink frequency on which the UE performs relaying between the network and the another UE, and
   wherein the UE sidelink frequency is different from the relay sidelink frequency;
   performing a relay sidelink operation based on the relay sidelink frequency information; and
   reporting, to the network, traffic quantity information for the relay sidelink operation,
   wherein the traffic quantity information includes at least one of a running average value of a traffic, a number of sidelink grants used for the relay sidelink operation, a number of physical resource blocks (PRBs), a number of transport blocks used for the relay sidelink operation, and a number of new transport blocks used for the relay sidelink operation.

2. The method of claim 1, wherein the UE sidelink frequency information and the relay sidelink frequency information are transmitted via sidelink UE information.

3. The method of claim 1, wherein the UE sidelink frequency information is configured by a first frequency list and the relay sidelink frequency information is configured by a second frequency list.

4. A user equipment (UE) comprising:
   a radio frequency (RF) transceiver configured to transmit and receive a radio signal; and
   a processor operated in association with the RF transceiver,
   wherein the processor is configured to:
   generate UE sidelink frequency information and relay sidelink frequency information; and
   control the RF transceiver to transmit, to a network, the UE sidelink frequency information and the relay sidelink frequency information,
   wherein the UE sidelink frequency information is information for a UE sidelink frequency on which the UE performs a sidelink operation between the UE and another UE,
   wherein the relay sidelink frequency information is information for a relay sidelink frequency on which the UE performs relaying between the network and the another UE, and
   wherein the UE sidelink frequency is different from the relay sidelink frequency;
   perform a relay sidelink operation based on the relay sidelink frequency information; and
   report, to the network, traffic quantity information for the relay sidelink operation,
   wherein the traffic quantity information includes at least one of a running average value of a traffic, a number of sidelink grants used for the relay sidelink operation, a number of physical resource blocks (PRBs), a number of transport blocks used for the relay sidelink operation, and a number of new transport blocks used for the relay sidelink operation.

5. The UE of claim 4, wherein the UE sidelink frequency information and the relay sidelink frequency information are transmitted via sidelink UE information.

* * * * *